INVENTORS
J. E. COTTLE
J. I. STEVENS
BY Hudson and Young
ATTORNEYS

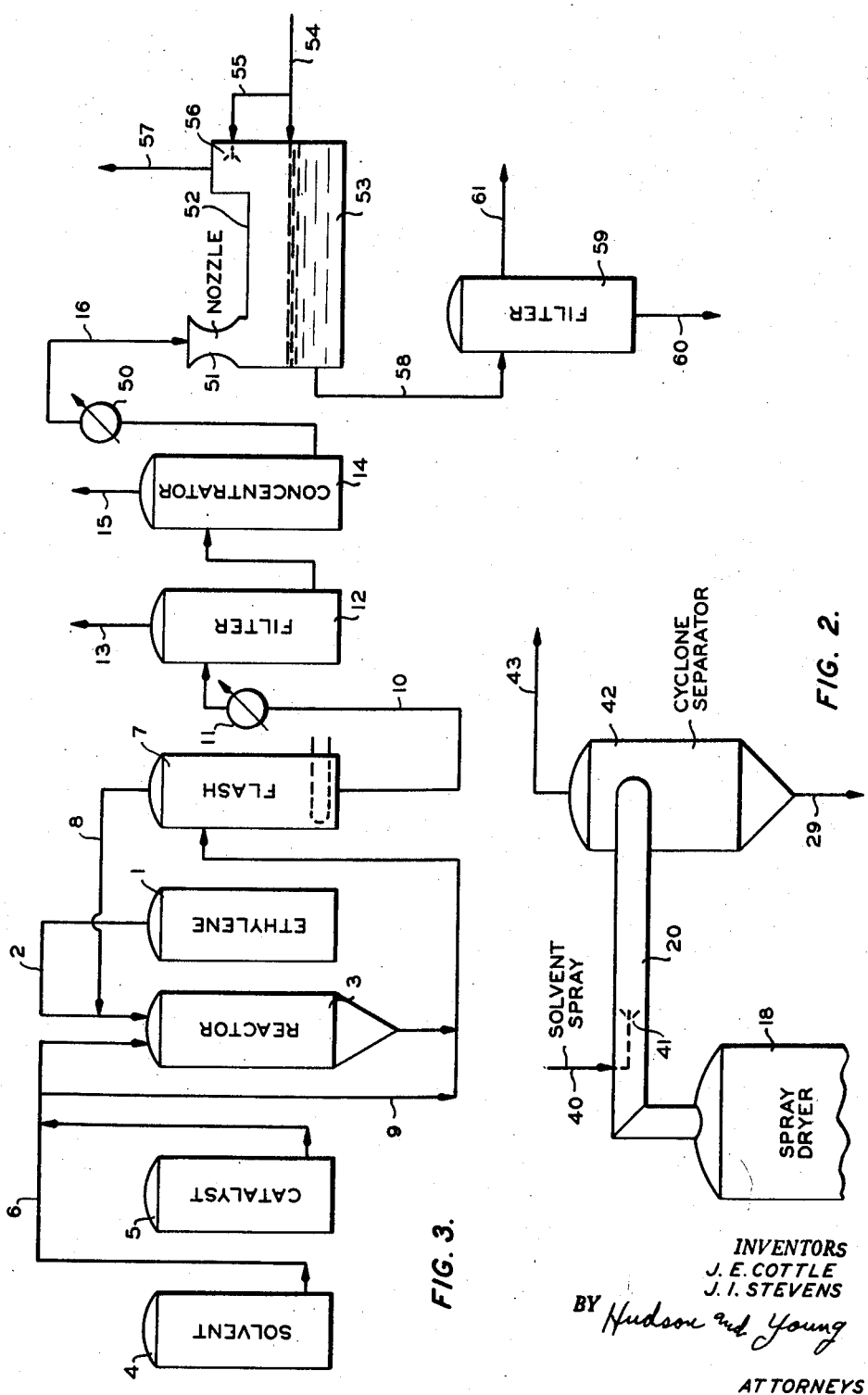

United States Patent Office 2,930,786
Patented Mar. 29, 1960

2,930,786

RECOVERY OF ENTRAINED SOLVENT FROM VAPORIZED SOLVENT FROM FLASHING STEP

John E. Cottle, Bartlesville, Okla., and James I. Stevens, Idaho Falls, Idaho, assignors to Phillips Petroleum Company, a corporation of Delaware Application October 22, 1956, Serial No. 617,587

5 Claims. (Cl. 260—94.9)

This invention relates to the recovery of solid polymer from a polymer solvent. In one aspect it relates to recovery of finely divided solid polymer from solvent vapor. In another aspect it relates to removal of finely divided solid polymer from solvent vapor resulting from flashing a polymer solution obtained from solution polymerization of ethylene or other olefin.

Several different processes are known to the art for production of normally solid polymers, such as polyethylene, polybutadiene, and polystyrene. One preferred method for polymerization of 1-olefins having a maximum of eight carbon atoms and no branching nearer the double bond than the 4-position is described in copending application, Serial No. 573,877, filed March 26, 1956, by J. P. Hogan and R. L. Banks, employing as a catalyst chromium oxide associated with at least one oxide selected from silica, alumina, zirconia, and thoria. The polymerization is conducted in the presence of a hydrocarbon diluent which is inert and liquid under the reaction conditions of the process including naphthenic and paraffinic hydrocarbons such as propane, isobutane, normal butane, normal pentane, isopentane, isooctane (2,2,4-trimethylpentane), cyclohexane, and methylcyclohexane. In some of these known processes, the polymer initially is obtained in the form of a solution in the solvent and must be recovered therefrom. Recovery of the polymer can be effected by different methods, such as solvent vaporization, which leaves the polymer as a non-volatile residue; cooling the solution to cause precipitation of the polymer, which is subsequently recovered by filtration; and water coagulation, wherein water is admixed with the solution under conditions of temperature and pressure to cause the polymer to precipitate as a solid, which is then separated from the liquid solvent and liquid water.

Vaporization processes for solvent removal are accompanied by difficulty in removing the last traces of solvent from the polymer. This difficulty arises from the fact that as the solution becomes more and more concentrated, its viscosity increases. Heat transfer is correspondingly retarded and, if proper and careful control is not exercised, the polymer may be thermally decomposed as a result of unduly high residence time in recovery equipment at high localized temperatures. A successful and preferred method for carrying out the solvent vaporization process is described in copending application, Serial No. 496,515, filed March 24, 1955, by Martin R. Cines. This recovery method comprises evaporating a substantial portion of the solvent in a first step, at a temperature above the melting point of the polymer; vaporizing most of the remaining unvaporized solvent at a temperature below the melting point of the polymer in a second step; and agitating the polymer at a temperature above its melting point to vaporize a substantial proportion of the remaining solvent in a third step; and recovering a substantially solvent-free polymer.

When polymer solutions are preheated and flashed to remove solvent a considerable amount of the solidified polymer emerges from the nozzles, used to introduce the solution into the flash chamber, as a light, finely divided material which is carried out in the solvent vapor stream. These solid particles tend to accumulate upon the inner surfaces of heat exchanger equipment, utilized to cool the vapor stream, before the stream is cooled. The low heat transfer properties of the polymer impairs the efficiency of the heat exchange equipment. The low density and small size of the polymer particles renders the stream inapplicable to removal of polymer by utilizing a cyclone separator. The use of filter bags and other conventional dust removing means is also undesirable because of the pressure drop introduced at this point in the system.

It is an object of this invention to provide a method and means for removing finely divided solid polymer contained in a vapor stream. It is also an object to provide means for removing low density solid dust from a vapor stream with substantially no increase in pressure drop in said stream. A further object of this invention is to remove polymer dust from a solvent vapor stream before the stream is introduced to a condenser. Other and further objects and advantages will become apparent to one skilled in the art upon study of the disclosure of the invention, including the attached drawing wherein:

Figure 2 illustrates a modification of the dust knockdown device of Figure 1; and Figure 3 illustrates another embodiment of the invention as applied to an olefin polymerization process.

Figure 1:
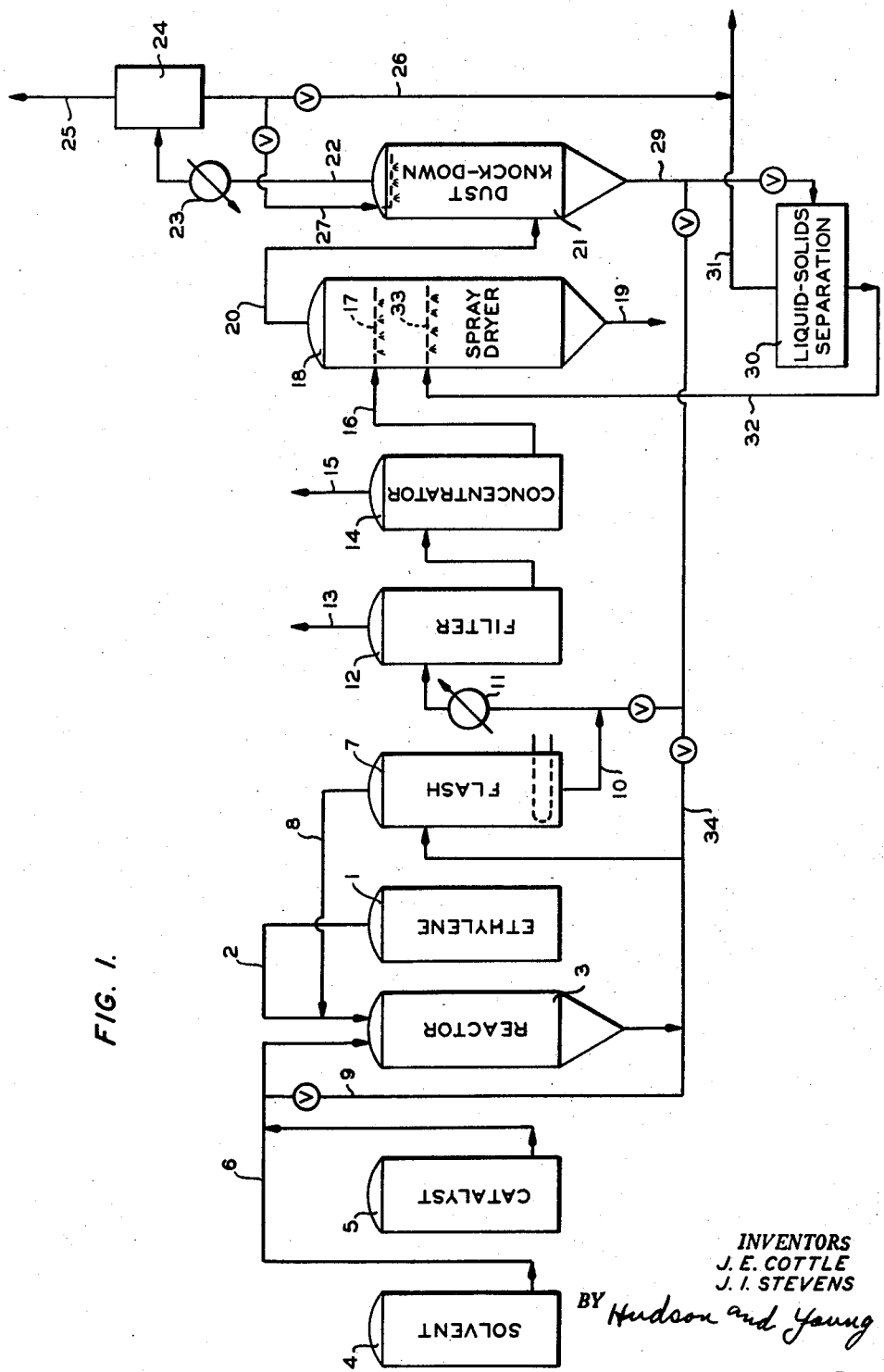
Figure 1 is a diagrammatic illustration of one embodiment of the invention as applied to an olefin polymerization process.

We have discovered that the polymer dust which results from flashing a solution of a normally solid polymer in an inert diluent, can be effectively removed from the vapor produced in the flashing operation and recovered as polymer product by trapping the polymer dust in cold diluent liquid. In a preferred embodiment of the invention the same inert liquid is utilized as the solvent or diluent in which the polymerization is conducted, as the solvent for dissolving the polymer for catalyst removal, and as the liquid for trapping the polymer dust. Thus, according to this embodiment of the invention, the cold liquid containing the polymer dust is utilized as, at least a portion of, the solvent required to dissolve the polymer produced in the reactor.

We have discovered that the light, finely divided polymer dust is rendered susceptible to conventional separation methods when wetted with a spray of cold inert liquid. Therefore, in one embodiment of the invention the dust-containing vapor stream is contacted with a spray of cold diluent, or solvent, liquid and the wetted particles are then removed from the stream by means of a cyclone separator. In another embodiment of the invention the dust-containing vapor stream is directed onto the surface of a body of cold inert liquid so that the solid particles are wetted and removed from the vapor.

Referring now to Figure 1 of the drawing, ethylene is passed from the source 1 via conduit 2 to reactor 3. Solvent from source 4 and catalyst from source 5 are passed via conduit 6 to reactor 3 in the form of a catalyst in solvent slurry. The reactor effluent is passed to flash and dissolution vessel 7 where unreacted ethylene is vented via conduit 8 and returned to reactor 3. Sufficient solvent is introduced to dissolution vessel 7 via conduit 9 to provide a fluid solution of polymer. The polymer solution, containing solid catalyst, is passed via conduit 10 and heater 11 to filter 12 where the catalyst containing filter cake is removed at 13. The filtrate passes to concentrator 14 where excess solvent is removed via conduit 15 and the concentrated polymer solution is passed via conduit 16 to spray nozzles 17 located in spray dryer 18. Product polymer is removed from spray dryer 18 at 19 and the solvent vapors, containing polymer dust, are removed via conduit 20 to dust knock-down device 21, which is illustrated as spray tower. Polymer-free solvent vapors pass from spray tower 21 via conduit 22 and cooler 23 to accumulator 24. Non-condensed vapors are vented from accumulator 24 via conduit 25 and liquid solvent is removed via conduit 26 for further purification or return to solvent source 4. A portion of the solvent is directed via conduit 27 to spray nozzles 28 in spray tower 21.

The polymer fines which are removed from the vapors in spray tower 21 are recovered via conduit 29 and can be passed to liquid-solids separation means 30, which can be a filter, centrifuge or the like. Solvent is removed via conduit 31 and solid polymer, in the form of a concentrated slurry is passed via conduit 32 to spray nozzles 33 in spray dryer 18.

The polymer fines recovered from spray tower 21 as a dilute slurry in solvent, can be passed via conduit 29 to conduit 10 as diluent which is required to provide a fluid polymer solution for filter 12. If desired this stream can be passed via conduit 34 to vessel 7 to supplement, or as a substitute for, the solvent provided via conduit 9.

A modification of the dust knock-down device is shown in Figure 2. In this modification the solvent vapors removed from spray dryer 18 via conduit 20 are contacted with a spray 41, of cold solvent from conduit 40 so as to wet the polymer particles with liquid solvent. This stream then passes to cyclone separator 42 where the wetted polymer particles are removed via conduit 29 and the polymer-free solvent vapors are removed via conduit 43. The slurry of polymer in solvent in conduit 29 is utilized as in Figure 1.

In the modification shown in Figure 3 the concentrated polymer solution from concentrator 14 passes via conduit 16 and heat exchanger 50 to nozzle 51 which sprays or flashes the solution into vessel 52 onto the surface of a body of cold solvent 53 which is supplied to the vessel via conduit 54. The cold solvent conveniently can be the same as that used to dissolve the polymer produced in the reactor, however, it can be different if desired. Additional solvent is introduced via conduit 55 and spray nozzle 56. Reduced pressure is maintained in the vessel 52 by a vacuum pump (not shown) connected to conduit 57. Liquid solvent, containing solid polymer, is withdrawn via conduit 58 and passed to filter 59. Solid polymer product is removed via 60 and solvent is withdrawn via conduit 61 for purification or reuse. Solvent vapors removed via conduit 57 are cooled and condensed similarly to vapors in conduit 22 of Figure 1. The cold solvent spray 56 knocks down solid polymer fines which are not trapped by liquid body 53 so that the vapors removed via conduit 57 are substantially free from polymer. Thus, in the modification shown in Figure 3 the spray dryer 18 and the dust knock-down means 21 of Fugure 1 are, in effect, combined into a single unit.

A better understanding of the invention may be had by reference to the following description of a specific embodiment of the invention as applied to the process of Figure 1. A typical run is described for the polymerization of ethylene in cyclohexane over a chromium oxide on silica-alumina catalyst as described in copending application, Serial No. 573,877, filed March 26, 1956, by J. P. Hogan and R. L. Banks. The catalyst is prepared by impregnation of silica-alumina (90/10) with chromium trioxide solution, followed by drying and activation with dry air for about 6 hours at 950° F. The reactor effluent is heated and flashed to remove unreacted ethylene and the heated mixture is diluted with additional cyclohexane and passed to a filter 12 at a temperature of about 300° F. for removal of catalyst. The filtrate comprising polymer in solution passes from the filter to a flash concentrator 14 where a substantial amount of the cyclohexane is vaporized and removed. The pressure in the reactor is about 450 p.s.i.a., is reduced to about 150 p.s.i.a. in the ethylene flash vessel 7, and is further reduced to about 78 p.s.i.a. in the flash concentrator 14. The concentrated polymer solution is passed from the concentrator 14 at a temperature of about 400° F. to spray dryer 18 where the temperature is reduced to about 125° F. and the pressure is reduced to about 6 p.s.i.a. Polymer and a small amount of unvaporized cyclohexane are removed from spray dryer 18 at outlet conduit 19.

Vaporized cyclohexane containing a suspension of finely divided solid polymer is passed to spray tower 21 in countercurrent relationship to a spray of cold cyclohexane. Cyclohexane vapors, substantially free from polymer, are cooled and condensed in condenser 23 to a temperature of about 100° F. and a pressure of about 5 p.s.i.a. Liquid cyclohexane containing particles of solid polymer is removed from spray tower 21 via conduit 29 and is passed as diluent solvent to ethylene flash vessel via conduits 34 and 9 or is admitted to the effluent from vessel 7 in conduit 10.

A material balance of a typical run as described with reference to Figure 1 is shown in Table I.

TABLE I

*Pounds per unit of time*

| Reference No. | Ethylene | Cyclohexane | Polymer | Catalyst |
|---|---|---|---|---|
| 10 | 5 | 1,150 | 100 | 1 |
| 11 | 5 | 2,450 | 102 | 1 |
| 13 | | 10 | 1 | 1 |
| 14 | 5 | 2,440 | 101 | |
| 15 | 4.5 | 520 | | |
| 16 | 0.5 | 1,920 | 101 | |
| 19 | | | 99 | |
| 20 | 0.5 | 1,920 | 2 | |
| 27 | | 198 | | |
| 22 | 0.5 | 1,920 | | |
| 25 | 0.5 | 3 | | |
| 26 | | 1,719 | | |
| 29 | | 198 | 2 | |

Variations and modifications are possible within the scope of the disclosures of the present invention, the essence of which is the provision of a method for removing a suspension of finely divided solid polymer from a vaporized solvent stream without introducing an extraneous material or by introducing an excessive pressure drop in the stream.

That which is claimed is:

1. In the process of separating a solid polymer of a 1-olefin having no more than 8 carbon atoms and no branching nearer the double bond than the 4-position from solution in an inert, liquid hydrocarbon solvent which comprises heating the solution and withdrawing solvent vapors to form a hot concentrated solution; flashing the hot solution into a zone of reduced pressure at a temperature below the melting point of the polymer; with drawing solid polymer from said zone; withdrawing vaporized solvent containing a suspension of finely divided solid polymer particles from said zone; passing said vapor to a separation zone; the improvement which comprises contacting said vapor with a spray of cold solvent; recovering solvent vapors, substantially free from polymer, from said separation zone; withdrawing a slurry of solid polymer in liquid solvent from said separation zone; recovering a portion of liquid solvent from said slurry; and passing said slurry containing the remaining solvent to said zone of reduced pressure.

2. In the process of recovering solid polymer and polymer solvent from the reactor effluent of a 1-olefin polymerization reaction wherein a 1-olefin having a maximum of eight carbon atoms and no branching nearer the double bond than the 4-position is polymerized in an inert, liquid hydrocarbon solvent in the presence of a solid catalyst and wherein said reactor effluent comprises a mixture of solid catalyst and a solution of the polymer in solvent which comprises adding diluent solvent, hereinafter referred to, to said effluent mixture; heating said diluted mixture to form a fluid solution of polymer in solvent; filtering said diluted mixture to remove solid catalyst; heating the resulting diluted polymer solution and withdrawing solvent vapors to form a hot concentrated solution; flashing the hot solution into a zone of reduced pressure at a temperature below the melting point of the polymer; withdrawing vaporized solvent containing a suspension of finely divided solid polymer particles from said zone of reduced pressure; recovering solid polymer from said zone of reduced pressure; passing said vapor to a separation zone; the improvement which comprises contacting said vapor with a spray of cold solvent; recovering solvent vapors, substantially free from polymer, from said separation zone; withdrawing a slurry of solid polymer in liquid solvent from said separation zone; and adding said slurry to said reactor effluent as said hereinbefore referred to diluent solvent.

3. In the process of separating a normally solid thermoplastic polymer from solution in a liquid solvent by heating and flashing the solution into a zone of reduced pressure at a temperature below the melting point of the polymer to vaporize the solvent, the steps of contacting the vaporized solvent with a stream of said liquid solvent so as to wet finely divided particles of solid polymer contained in said vaporized solvent; and removing a mixture of solid polymer and liquid solvent from said vaporized solvent.

4. In the process of separating a normally solid polymer of ethylene from solution in a solvent comprising cyclohexane which comprises heating the solution, withdrawing cyclohexane vapors to form a highly concentrated solution, flashing the hot solution into a zone of reduced pressure at a temperature below the melting point of the polymer, and withdrawing vaporized cyclohexane containing a suspension of finely divided solid polymer particles from said zone, the improvement which comprises the steps of passing said vapor to a separation zone; contacting said vapor with a stream of cold liquid cyclohexane in said separation zone; recovering a slurry of solid polymer in liquid cyclohexane from said separation zone; and separately recovering cyclohexane vapors, substantially free from polymer, from said separation zone.

5. In the process for separately recovering solid polyethylene and cyclohexane from the reactor effluent of an ethylene polymerization reaction wherein ethylene is polymerized in cyclohexane in the presence of a solid catalyst comprising chromium oxide associated with at least one oxide selected from the class consisting of silica, alumina, zirconia, and thoria and wherein said reactor effluent comprises a mixture of said solid catalyst and a solution of polyethylene in cyclohexane, the steps which comprise adding liquid diluent cyclohexane, hereinafter referred to, to said effluent mixture; heating said diluted mixture to form a fluid solution of ethylene in cyclohexane; filtering said diluted mixture to remove solid catalyst; heating the resulting diluted polyethylene solution and withdrawing cyclohexane vapors to form a hot concentrated solution; flashing the hot solution into a zone of reduced pressure at a temperature below the melting point of the polyethylene; withdrawing vaporized cyclohexane containing a suspension of finely divided solid polyethylene particles from said zone of reduced pressure; recovering solid polyethylene from said zone of reduced pressure; passing said vapor to a separation zone; contacting said vapor with a spray of cold liquid cyclohexane; recovering cyclohexane vapors, substantially free from polymer, from said separation zone; withdrawing a slurry of solid polyethylene in liquid cyclohexane from said separation zone; and adding said slurry to said reactor effluent as said hereinbefore referred to liquid diluent cyclohexane.

References Cited in the file of this patent

UNITED STATES PATENTS

| | | |
|---|---|---|
| 1,749,260 | Pretot et al. | Mar. 4, 1930 |
| 2,578,315 | Parker | Dec. 11, 1951 |
| 2,702,699 | Kinney | Feb. 22, 1955 |
| 2,709,580 | Kameya | May 31, 1955 |
| 2,728,753 | Russum et al. | Dec. 27, 1955 |
| 2,731,453 | Field et al. | Jan. 17, 1956 |
| 2,820,779 | Dale | Jan. 21, 1958 |
| 2,837,504 | Hanson et al. | June 3, 1958 |